United States Patent

Dischert et al.

[15] 3,684,825

[45] Aug. 15, 1972

[54] CONTRAST COMPRESSION CIRCUITS

[72] Inventors: Robert Adams Dischert; John Francis Monahan, both of Burlington, N.J.

[73] Assignee: RCA Corporation

[22] Filed: Feb. 19, 1971

[21] Appl. No.: 117,016

[52] U.S. Cl. .........................178/5.4 R, 178/DIG. 16

[51] Int. Cl. ...............................................H04n 9/53

[58] Field of Search........178/DIG. 16, 5.4 AC, 5.4 R

[56] References Cited

UNITED STATES PATENTS 2,627,547 2/1953 Bedford..............178/DIG. 16

2,937,231 5/1960 Jones......................178/5.4 R 2,956,113 10/1960 Kaashoek et al........178/5.4 R

*Primary Examiner*—Robert L. Griffin

*Assistant Examiner*—Donald E. Stout

*Attorney*—Eugene M. Whitacre

[57] ABSTRACT

Apparatus for a television camera is described wherein the highest peak intensity of one of the primary colors is processed to form a multiplying control signal. The control signal is used to compensate a video signal in order to obtain a reduced range of contrast values capable of being adequately displayed by the system.

8 Claims, 3 Drawing Figures

INVENTORS.
Robert A. Dischert and
John F. Monahan
BY [signature]
ATTORNEY

CONTRAST COMPRESSION CIRCUITS

This invention relates to color television systems and, more particularly, to apparatus for providing a television signal having a compressed contrast range.

Presently, color television cameras employ gamma correcting circuits included in each color signal information processing path. The function of such gamma correctors is to compensate for the characteristics of the kinescope employed in the receiver. The object is to transmit a composite television signal which will be adequately reproduced by the receiver display in spite of the non-linearities inherent in the kinescope.

In the utilization of such cameras, there has arisen a problem which is apparent when televising scenes having large contrast ranges. A typical scene which can create a contrast problem would be, for example, that occurring during a sporting event. Depending upon the time of day, the scene may be represented by an extremely bright area and an extremely dark area. Such a situation can occur on a sporting field on a late afternoon where both bright sunlight and deep shadow are present on the field. If the television camera operator desires to televise detail in the dark area, this requires him to open the iris of the camera. If this were done, the bright sunlight would serve to saturate the system. Alternatively, if the iris is closed, the dark area would appear completely black. In any event, such a situation requires that a compromise signal be sent. This is so as the contrast ratio between white and black can exceed 100:1 in such a scene while the system is only capable of adequately displaying a ratio of about 20:1.

Under present techniques the television camera operator would set the iris of the camera at some compromise value. He would then attempt to accommodate the large contrast range by increasing the effect of the individual gamma correction circuits provided in the red, blue and green color channels to a maximum value. By doing this, the operator is attempting to reduce the signal, but he will also desaturate the colors and hence create color distortion.

It is therefore an object of the present invention to modify the gain of the color information signals equally in order to preserve the relative contribution of each signal towards the formation of a composite television signal.

Accordingly, the apparatus to be described functions to compress the contrast range while further assuring that the respective predetermined proportions between each of the three primary colors is maintained.

These and other objects are accomplished in a preferred embodiment by utilizing apparatus as a camera which normally serves to produce color video information signals. Each of the color information signals is determined by the intensity of a predetermined primary color reflected by the scene. In combination therewith there is included apparatus having means responsive to the color information signals to provide a control signal whose magnitude is indicative of that color information signal having the largest intensity as reflected by the scene. This control signal is applied to separate means which are also coupled to the signal processing path and which serve to multiply a signal processing path and which serve to multiply a signal or signals propagating in the path by the control signal. The multiplication factor is selected and determined according to a desired contrast compression. Due to the nature of the multiplication, the characteristics between the information signals remain at the same proportions with respect to each other to thereby assure that subsequent processing will provide a signal determined according to the proper color proportions. Accordingly, a contrast compression is obtained without accompanying color distortion.

A detailed description of the present invention will be had with reference made to the following specification and figures in which.

Figures 1, 2:
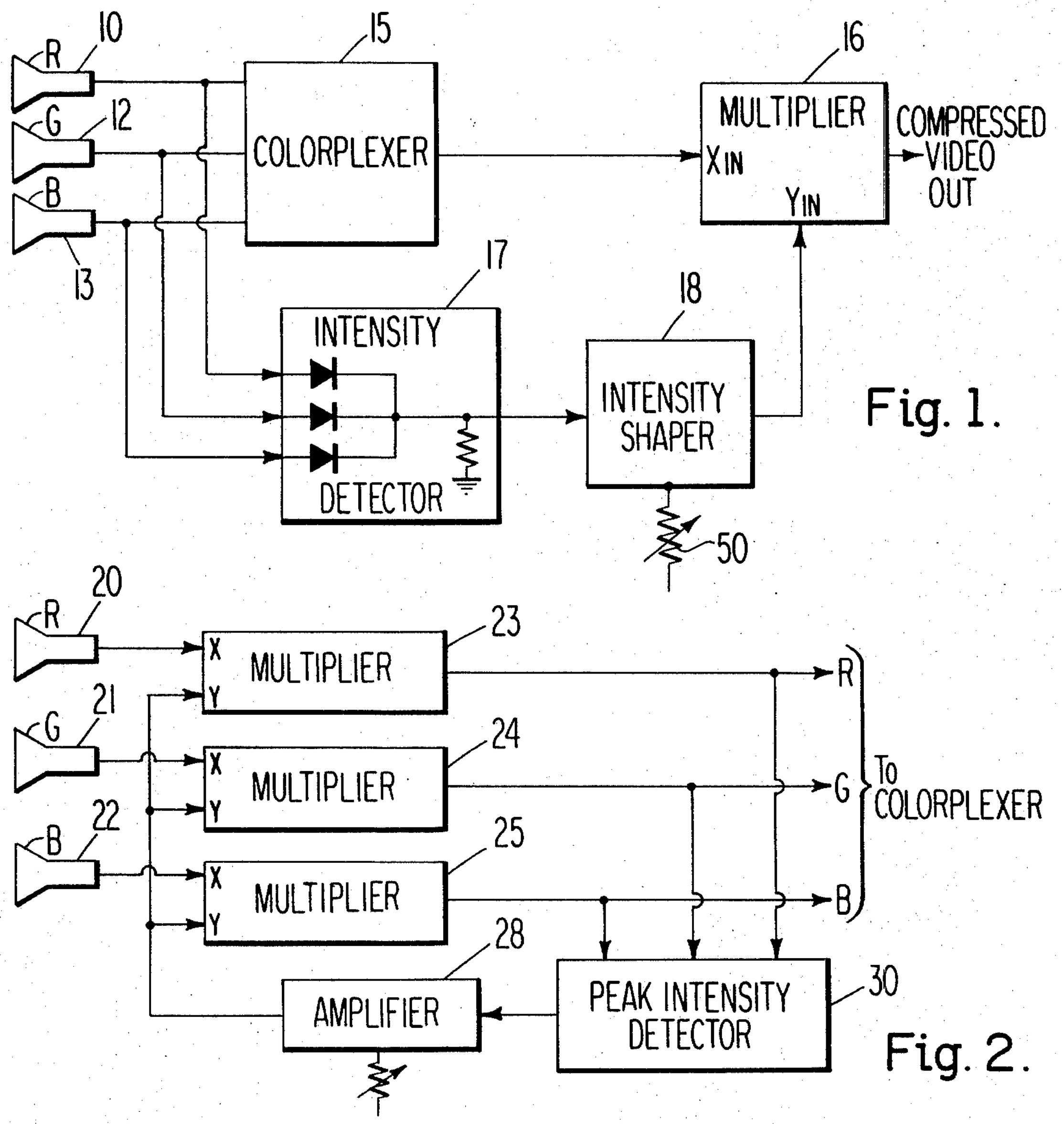
FIG. 1 is a block diagram of a portion of a color television camera employing a contrast compression system according to this invention.
FIG. 2 is a block diagram of an alternate embodiment of the present invention.

Referring to FIG. 1, there is shown the front end of a three tube color camera. Such cameras employ a separate image pickup device for each one of three primary colors. Accordingly, numeral 10 references a red image pickup tube to respond to the red light content of the scene. Similarly, there is a green image pickup device 12 and a blue image pickup device 13. Each of the above-noted image pickup devices serves to respond to the associated color reflected by the scene to produce at an output thereof an electrical signal having amplitude information proportional to the intensity of the light of that color as reflected by the scene. Essentially, the signal at the output of each of the image pickup devices is proportional to the spectral energy reflected by that color from the scene.

In the figure an output of each of the three image pickup devices is applied to an appropriate input of a colorplexer 15. The colorplexer 15 is a device which is known in the art, and serves to combine the three color signals in the correct proportions to thereby produce the composite signal. The composite signal, according to present television standards, is formulated from the proper proportioning of each color signal and according to the well known NTSC standards.

The output from the colorplexer 15 is applied to a wide band multiplier circuit 16. Essentially, the multiplier 16 serves to arithmetically multiply the signal applied to one input terminal by the signal applied to the other input terminal. Such multipliers as 16 are well known in the art.

The output of each image pickup device is also coupled to an appropriate input of an intensity detector 17. The detector 17 operates to non-additively mix the red, green and blue video signals and provide at its output a signal representative of that color signal which has the highest instantaneous peak intensity. This peak intensity control signal is then applied to an intensity shaper module 18, where it is processed according to a predetermined relationship selected in accordance with a desired contrast compression. The output of the intensity shaper 18 is applied to a second input terminal of the multiplier 16. The intensity signal as selected serves to multiply the composite signal in such a manner that a contrast compression will be provided. The fact that the entire signal is multiplied by the same factor assures that the respective proportions of each color signal are maintained. In this manner the output of the multiplier 16 will provide a video signal which possesses a compressed contrast range.

In order to further explain the operation of the circuit described above, the following mathematical relationships are offered:

$E_o = E_{x_{in}} \times E_{y_{in}}$ where: $E_o$ = the output signal from multiplier 16.

$E_{x_{in}}$ = the input at $x_{in}$ from colorplexer 15 to multiplier 16.

$E_{y_{in}}$ = the input at $y_{in}$ from intensity shaper 18 to multiplier 16.

Let:

$E_{x_{in}} = E_m$ $E_m$ = luminance value of composite video signal for a white scene.

$E_{y_{in}} = f(E_i)$ = a function of $E_i$ $E_i$ = peak instantaneous value of the most intense color.

$E_i = E_m$ for a white scene.

Then:

$E_o = E_m \times f(E_m)$ for a white scene.

It is desired that $E_o = E_m^{\gamma p}$ $\gamma p$ = is "picture gamma".

Therefore $E_m^{\gamma p} = E_m f(E_i)$ $$f(E_i) = \frac{E_m^{\gamma p}}{E_m} = E_m^{(\gamma p - 1)}$$

The term $\gamma p$ or picture gamma is utilized to most correctly describe the effect of the above-described circuit operation.

Essentially, prior art gamma correction concerned individual gamma correctors for each primary color channel.

These correctors, as indicated, could reduce the contrast ratio of the scene by increasing the brightness of the lower brightness areas of the picture with respect to the higher brightness areas. However, due to the fact that these gamma correctors are selected on a color basis and do not track, an adjustment of the same would adversely affect the saturation and hue of the colors.

In this scheme the operation or gain control is equal on all color channels, thereby affecting all information components of the signal equally. Thus, the proper proportions are maintained and true color is generated, while the low brightness areas of the scene are increased according to the most intense or highest brightness color reflected from the scene.

For example, it appears desirable to obtain a "picture gamma" of 0.5 in order to display a good quality picture with a contrast ratio between black and white of about 20:1.

Hence, using the above equation, the value of picture gamma of 0.5 yields:

Since $E_o = E_m f(E_m)$ for white then $$E_o = E_m \cdot E_m^{1/2} = E_m \sqrt{E_m}$$

Thus, the function $f(E_i)$ is equal to $\sqrt{E_m}/E_m$ or $1/\sqrt{E_m}$.

This specifies that for a picture gamma of 0.5 the transfer characteristic of the intensity detector 17 and the intensity shaper 18 is selected to be equal to $1/\sqrt{E_m}$.

According to the above analysis, it is seen therefore that the composite signal, when multiplied by the appropriate factor, now possesses a limited contrast range determined by a preferred selected picture gamma coefficient.

Coupled to the output of the intensity shaper is a potentiometer 50, which serves to adjust the characteristics of the shaping function in order to provide a plurality of different gamma corrections. Therefore, the television camera operator will be able to select a gamma according to his preferences in order to obtain the best combination when producing a scene which possesses a contrast ratio exceeding the dynamic range of the system. This contrast compression as indicated will be afforded without the accompanying color distortion provided by the prior art techniques.

Referring to FIG. 2, there is shown an alternate embodiment of a system which serves to afford contrast compression. Three color image pickup devices 20, 21, 22 serve to respond to the three primary colors red, green and blue. The output of each device is applied to an input of separate wide band multipliers 23, 24, 25. Another input of each multiplier is coupled to an output of an amplifier circuit 28.

In this manner each of the color information signals will be multiplied by the same signal as emanating from amplifier 28. The input to the amplifier 28 is supplied from the output of a peak intensity detector 30. The peak intensity detector 30 has three inputs, each separate one of which is coupled to a separate output of an associated multiplier. The function of the peak intensity detector 30 is the same as that of detector 17 described above. Therefore, the detector 30 serves to non-additively mix the R, B and G video signals to provide at its output that signal which has the highest instantaneous peak intensity. This signal is then applied to the input of the amplifier, which serves to shape the signal according to a predetermined desired relationship.

Essentially, the circuit in FIG. 2 can be described by the following mathematical relationships:

$E_o = (E_x \times E_y)$ = transfer function of multiplier where:

$E_x$ = color signal from image pickup device = $E_c$ $E_y = f(E_o)$ = function of a color signal having highest peak intensity.

then:

$E_o = E_c f(E_o)$ now let $f(E_o) = a - bE_o$ $E_o = E_c(a - bE_o)$ and therefore $E_o = (a) E_c/1 + (b) E_c$ From the above mathematical description, it can be seen that the final signal which will be obtained by applying the read, green and blue multiplied signals to a suitable colorplexer will be compressed in contrast, the correction being determined by the above-noted coefficients a and b.

The circuit in FIG. 2 serves to maintain the proportions between the R, B and G signals proper due to the fact that all three signals were multiplied by the same identical correction factor as described above. Therefore, the color information contained in the composite signal still possesses the same proportions while the overall picture will change in contrast only.

Figure 3:
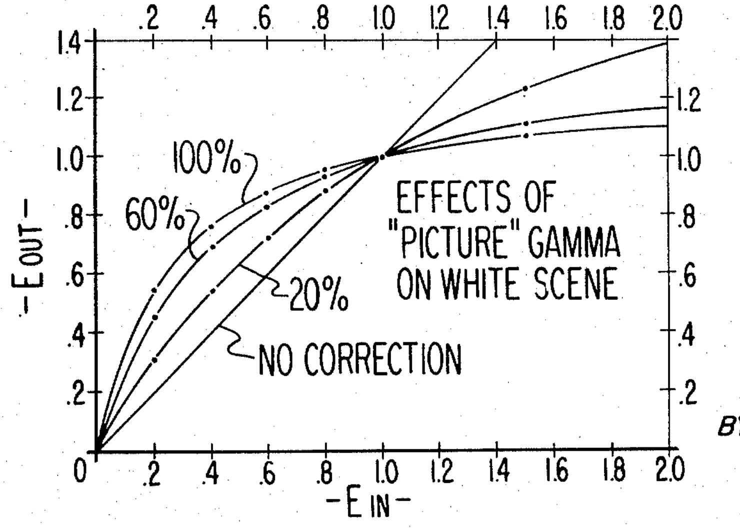
FIG. 3 is a graph showing the effects of picture gamma or contrast compression on white scene.

If reference is made to FIG. 3, there is shown a graph of the effects of the "picture gamma" changes on a white scene. The curves of FIG. 3 were obtained by varying the correction from 100 to 0 percent setting the above-noted coefficients of *a* and *b* to 5 and 4, respectively. The range of control with these coefficients was obtained by varying the gain of the amplifier 28 and hence the magnitude of the signal applied in common to each of the multipliers 23, 24 and 25.

What is claimed is:

1. Apparatus for use in a color television system including means for deriving video signals from a scene, said signals being representative of the color content of said scene, comprising:

a. a plurality of signal source means producing at their respective outputs color information electrical signals respectively responsive to the intensity of different colors of light reflected by said scene, b. control signal generation means responsive to said electrical signals to provide a control signal principally responsive to each of said color information electrical signals so long as it is not smaller than one of the others, said control signal thereby being indicative of the maximum intensity of any of said different primary colors, and c. signal processing means having a plurality of input terminals coupled respectively to the outputs of said signal source means and another input terminal coupled to receive said control signal, said signal processing means including a multiplier for multiplying signal information as obtained from each of said color information electrical signals by the same factor and in proportion to said control signal to provide modified signal information having a reduced contrast range with respect to said color information electrical signals.

2. An apparatus for producing a composite video information signal containing a plurality of color information signals and a luminance information signal representative of the brightness of a desired scene, comprising:

a. means to provide said color information signals, each of said color information signals respectively determined by the intensity of a different predetermined primary color reflected by said scene, b. signal combining means having inputs coupled to receive respective ones of said color information signals and an output from which a first composite video signal is provided in response to predetermined proportioned amounts of said color information signals, c. control signal generation means coupled to receive said color information signals to detect the largest of the same to provide a control signal indicative of the maximum light intensity associated with each color information signal as reflected by said scene, d. multiplier means having a first input to which said first composite video signal is coupled, having a second input to which said control signal is coupled, and an output for providing a second composite video signal which is the product of said first composite video signal and said control signal, whereby said second composite video signal is compressed in contrast range with respect to said first composite video signal.

3. Apparatus for reducing the contrast range of a televised scene by providing a composite video information signal representative of said scene and generated by a plurality of color information signals determined by the intensity of colors reflected by said scene, comprising:

a. means to provide said plurality of color information signals which have predetermined phase and amplitude characteristics with respect to each other:

b. first means responsive to said color information signals for detecting the largest of the same to provide a control signal indicative of the peak intensity of the most intense of said colors reflected by said scene, c. second means coupled to said first means for processing said control signal according to a predetermined relationship selected in accordance with a desired contrast range to provide a processed control signal d. means coupled to said second means and responsive to said color information signals to multiply said signals by said processed control signal to provide multiplied color information signals in which the proper proportions between said predetermined characteristics as existing prior to said multiplication are maintained, and in which the contrast range is reduced with respect to said color information signals.

4. The apparatus according to claim 2 wherein said color information signals are those representative of the red, blue and green content of the televised scene.

5. The apparatus according to claim 2 wherein said predetermined relationship is approximately equal to:

$$E_{\mathrm{m}}^{(\gamma\mathrm{p}-1)}$$

where:

$E_m$ = luminance value of composite video signal for a white scene.

$\gamma p$ = "picture gamma" equals a decimal number between 0 and 1.

6. Apparatus for reducing the contrast range of a televised scene by providing at an output composite video information signal representative of said scene and generated by color information signals determined by the intensity of primary colors reflected by said scene, said color information signals having predetermined phase and amplitude characteristics proportioned in accordance with a luminance signal representative of the brightness of said scene, comprising:

a. a plurality of multiplier circuits, each having first and second input terminal and an output terminal, said first input terminals adapted to receive a different one of said color information signals, b. first means coupled to each of said output terminals of said multiplier circuits for detecting the largest of the signals provided at each said output terminal and therefore providing a control signal indicative of the most intense of said primary colors, c. second means responsive to said control signal and having an output terminal coupled to each of said second terminals of said multipliers to cause said multipliers to provide at said outputs other color information signals each multiplied by the same factor while maintaining said characteristics between said signals at the same proportions with respect to one another as existing prior to said multiplication.

7. The apparatus according to claim 6 wherein said second means serves to provide a control signal according to the following relationship:

$$(a-bE_o)$$

where:

$a$ = a constant $b$ = a constant $E_o$ = output of multiplier.

8. The apparatus according to claim 6 wherein said color information signals are representative of red, green and blue.

* * * * *